No. 801,963. PATENTED OCT. 17, 1905.
A. D. BEATY.
BALING PRESS.
APPLICATION FILED SEPT. 26, 1904.
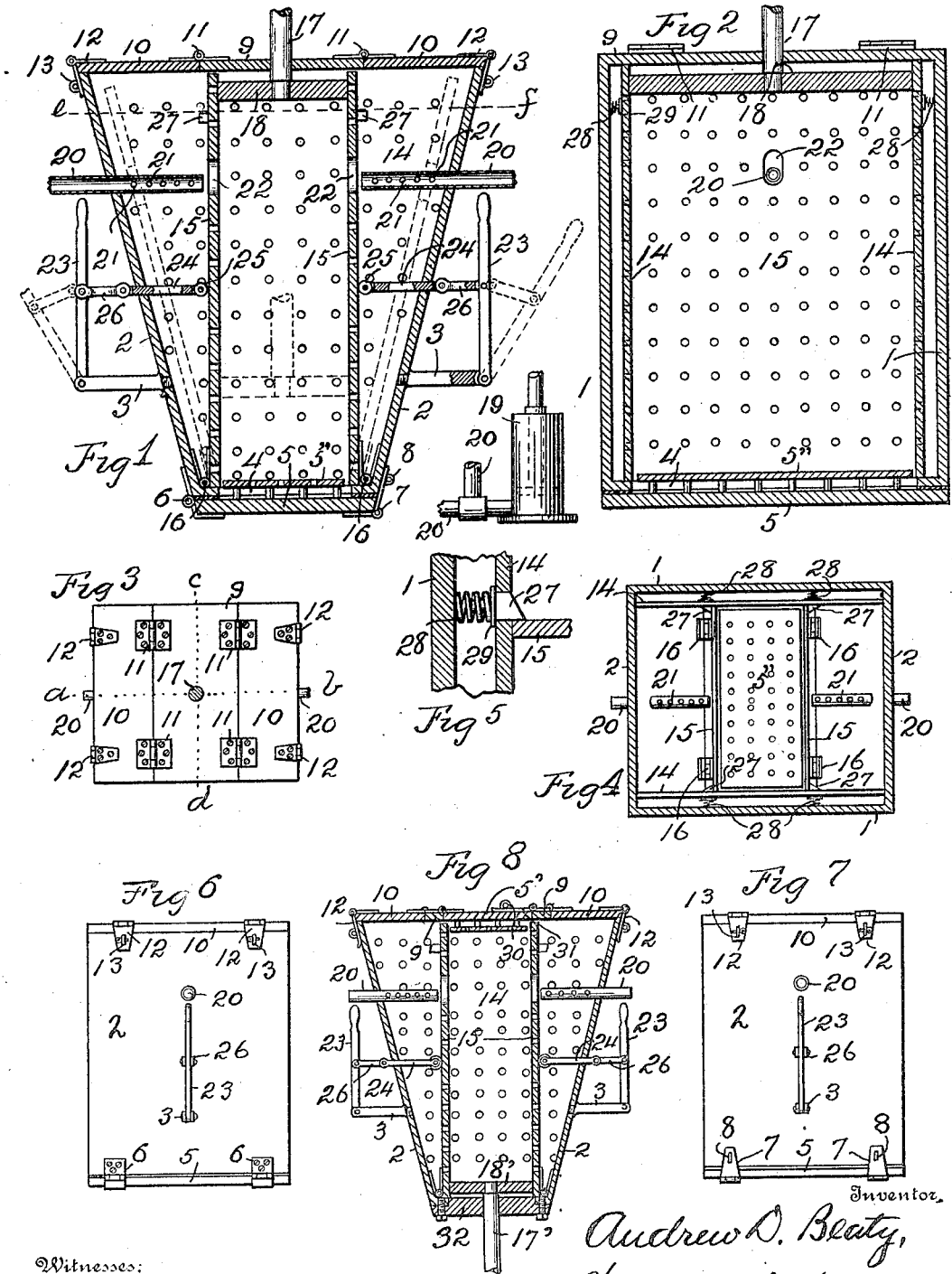

UNITED STATES PATENT OFFICE.

ANDREW D. BEATY, OF KANSAS CITY, MISSOURI.

BALING-PRESS.

No. 801,963.     Specification of Letters Patent.     Patented Oct. 17, 1905.

Original application filed August 21, 1902, Serial No. 120,609. Divided and this application filed September 26, 1904.

Serial No. 225,990.

*To all whom it may concern:*

Be it known that I, ANDREW D. BEATY, a citizen of the United States, residing in Kansas City, in the county of Jackson and State of Missouri, have invented a new and useful Improvement in Baling-Presses, of which the following is a specification, reference being had therein to the accompanying drawings, forming a part thereof.

My invention relates to improvements in baling-presses.

The object of my invention is to provide a baling-press by which raw cotton or similar material may be formed into bales which are held in form by external air-pressure, thus avoiding the necessity of strong fastenings and cheapening the baling of the cotton.

My invention is based on the principle of non-permeability to air of tightly-compressed raw cotton.

In operating my invention the raw cotton in a fluffy light condition has a portion of the air removed from its mass, after which the cotton is tightly compressed. When so compressed, the cotton is impermeable to the air, and the external air-pressure being greater than the internal air-pressure and resilience of the cotton the bale will be held in its compressed form.

This application is a division of an application filed by me on the 21st day of August, 1902, having Serial No. 120,609.

My invention provides a baling-chamber into which the cotton is introduced direct from the gin, suitable openings being provided for receiving and discharging the cotton, the openings being provided with suitable closures. Means are provided for creating a partial vacuum in the chamber, and means are also provided for tightly compressing the air-exhausted cotton into a bale and ejecting it from the chamber.

The novel features of my invention are hereinafter fully described and claimed.

In the accompanying drawings, illustrative of my invention, Figure 1 is a vertical sectional view of the baling-press, taken on the dotted line $a\,b$ of Fig. 3. In this view the baling-chamber is shown closed, with the perforated plungers shown in solid lines in the vertical position and in dotted lines in the positions occupied by them prior to the introduction of the cotton. In this view adjacent the baling-press is shown in side elevation a pump by which air is withdrawn from the baling-chamber, portions of the connecting air-pipes being broken away. Fig. 2 is a vertical longitudinal sectional view taken on the dotted line $c\,d$ of Fig. 3. Fig. 3 is a top view of the baling-press. Fig. 4 is a horizontal sectional view taken on the dotted line $e\,f$ of Fig. 1. Fig. 5 is an enlarged detail view, taken in the plane of the dotted line $e\,f$ of Fig. 1, of one of the locking devices and parts connected therewith employed to hold the perforated plungers in the vertical position. Fig. 6 is an elevation view of one side of the baling-press. Fig. 7 is a side elevation view of the opposite side of the baling-press. Fig. 8 is a transverse vertical sectional view of a modified form of my invention in which the discharge-opening is located in the top of the press.

Similar characters of reference denote similar parts.

In its preferable form the baling-chamber has two vertical sides 1, disposed parallel with each other and secured, respectively, to two inclined sides 2, which converge toward each other at their lower ends. The lower end of the baling-chamber is provided with a discharge-opening 4, adapted to be closed by a cover or door 5, hinged at one side edge to one side 2 by means of the hinges 6. Upon the opposite edge of the closure 5 are secured two hasps 7, adapted to engage, respectively, two staples 8, secured to the adjacent inclined side 2 of the baling-chamber. The top of the baling-chamber 9 is provided adjacent each side 2 with a feed-opening, through which the cotton is introduced to the baling-chamber. Two covers or closures 10 are hinged, respectively, at their inner edges by means of hinges 11 to opposite side edges, respectively, of the top 9. Said covers 10 when in the closed position are disposed horizontally and lie upon the upper edges of the sides 1 and 2 of the baling-chamber. Secured adjacent the outer edge of each cover 10 are two hasps 12, adapted to be engaged and secured to two staples 13, mounted in the adjacent side 2. Mounted within the baling-chamber, parallel with each other and adjacent, respectively, the vertical ends 1 of the chamber but separated therefrom, are two perforated inner walls 14. Two perforated swinging plungers 15, disposed perpendicularly to and between the walls 14, are hinged at their lower edges, respectively, by means of hinges 16 to the inner lower ends of the inclined sides 2 of the baling-chamber. The said perforated plungers 15 are movable laterally from the position shown in dotted lines in Fig. 1 to a vertical position.

17 denotes the plunger-rod of an ordinary baling-press, vertically reciprocable in an opening provided therefor in the top 9 of the baling-chamber.

Secured within the baling-chamber between the perforated sides 14 and movable sides 15 is a horizontal plunger 18, movable toward and from the closure 5.

19 denotes an air-pump of any desirable style, to the exhausting-chamber of which are connected the ends of the pipes 20, the opposite ends of which extend horizontally through suitable openings provided therefor, respectively, in the sides 2. The ends of the pipe 20 in those portions disposed within the baling-chamber are provided with transverse perforations 21, through which the air passes from the baling-chamber into the pipes 20.

The perforated plungers 15 are provided each with a slot 22, disposed so as to receive the adjacent pipe 20 when the perforated plungers are swung to the inclined outward position. Reciprocation of the perforated plungers 15 is obtained as follows: Two horizontal posts are secured, respectively, at their inner ends one to each inclined side 2 of the baling-chamber. Two upwardly-extending levers 23 are pivoted, respectively, at their lower ends to the outer ends, respectively, of the posts 3. Reciprocatively mounted, respectively, in openings provided therefor in the sides 2 are two horizontal bars 24, the inner end of each of which has mounted thereon a roller 25, adapted to bear against the outer side of the adjacent perforated plunger 15. Two links 26 are pivotally connected at their respective ends to the outer ends of the bars 24 and the levers 23, respectively. By moving the levers 23 inwardly the perforated plungers 15 may be swung inwardly from the inclined to the vertical position.

To releasably hold the perforated plungers in the vertical position, the following mechanism is provided: In horizontal openings provided in the sides 14 in positions adapted to engage and hold, respectively, the plungers 15 are mounted the horizontally-movable slide-bolts 27, each having an inclined inner end adapted to be engaged and forced outwardly by the adjacent plungers 15. Each of said bolts is normally held with its inner inclined end projecting beyond the inner side of the plate 14, in which it is mounted by means of a coil-spring 28, the outer end of which bears against the inner side of the adjacent wall 1 and the inner end of which bears against a shoulder 29, provided on the bolt 27 between the sides 1 and 14. When the plungers 15 are swung from the inclined toward the vertical position, they will strike the inclined inner ends of the slide-bolts 27, forcing said bolts outwardly until the plungers 15 have reached the vertical position, at which time the springs 28 will force the bolts 27 inwardly, so as to support upon the outer sides thereof and near their upper ends the plungers 15.

In operating my invention the plunger-rod 17 and plunger 18 are moved to the position shown in solid lines in Fig. 1. The cover 5 is swung on the hinges 6 to the closed position and held locked in such position by means of the hasps 7, which are engaged with the staples 8. The levers 23 are then swung to the positions denoted by dotted lines in Fig. 1. The slide-bolts 27 are then depressed and the perforated plungers 15 swung to the positions denoted by dotted lines in Fig. 1. The covers 10 are then swung upwardly and the raw cotton introduced into the baling-chamber through the feed-openings in the top thereof. The covers 10 are then closed and locked by means of the hasps 12 and staples 13. The air-pump 19 is then operated so as to withdraw air from the baling-chamber by means of the pipes 20, some of the openings 21 of which are disposed between the inclined walls 2 and the perforated plungers 15. Through the intermediacy of the pipes 20, perforated inner sides 14, and perforated plungers 15 a large amount of air may be quickly withdrawn from the mass of fluffy cotton held within the baling-chamber. When the pressure of the air within the baling-chamber has been reduced to a much less degree than the atmospheric pressure, the levers 23 are forced at their upper ends toward the baling-chamber, thus swinging the perforated plungers 15 to the vertical position against the piston 18 and through the intermediacy of the links 26, bars 24, and rollers 25, respectively. The plunger 18 is then forced downwardly between the perforated walls 14 and the perforated plungers 15. When the plunger 18 has been forced to a position in which the cotton will be tightly compressed, the bale will have been formed. The hasps 7 are then released from the staples 8 and the closure 5 is swung on the hinges 6, so as to fully uncover the discharge-opening 4. The plunger 18 is then forced downwardly until the bale of compressed cotton will have been ejected from the baling-chamber. As the tightly-compressed mass of cotton is impermeable to the air and as the pressure of the air outside the bale is greater than the pressure of the air contained thereon, the bale will be held in its compressed state by means of the external atmospheric pressure. Thus all danger of bursting bale-bands is obviated and very light bands may be used, and, in fact, even these may be dispensed with.

In Fig. 8 is illustrated a construction in which the discharge-opening is located in the top of the baling-chamber and the plunger 18' is forced upwardly in compressing the cotton. This form of my invention is constructed substantially similar to the form shown in the other figures, excepting that the discharge-closure 5' is hinged to the top 9 and has mounted on it a staple 30, adapted to be engaged by a hasp 31, hinged to the top 9. The bottom of the baling-chamber is closed by a horizontal base-plate 32, provided with a vertical opening in which is reciprocatively mounted the plunger-rod 17', to the upper end of which is secured the plunger 18'. The cotton is fed into the baling-chamber and preliminary compression obtained by swinging the plungers 15 in the same manner as already described with reference to the other form of my invention. The plunger 18' is then moved upwardly until the cotton has been tightly compressed, after which the hasp 31 is removed from the staple 30, the closure 5' raised, after which the plunger 18' is forced upwardly a distance sufficient to eject the compressed bale from the baling-chamber, after which the operation may be repeated as often as desired.

As cotton when compressed is impermeable to air, it is desirable that when the air is being pumped from the mass the cotton be in as light and fluffy a condition as possible. I therefore prefer to feed the cotton into the baling-chamber in the same form as it comes from the gin. For rapidity and certainty in exhausting the air from the mass it is preferable to withdraw the air from opposite directions, thus avoiding packing of the cotton over the air-holes through which the air is withdrawn. It is of great advantage to have the air-space encircling the cotton in the baling-chamber as large in area as possible, so that the air may be more rapidly withdrawn from the mass. I therefore provide four perforated side walls, as well as a perforated plate 5'', on the upper side of the closure 5. Air is thus withdrawn from five sides of the mass through perforated walls and also from the upper side around the edges of the plunger 18. By this construction rapidity and certainty of action in removing the air is attained. It will be understood that any suitable packing means may be employed for rendering the baling-chamber air-tight at its joints and around the openings. However, a completely air-tight chamber is not essential to the successful operation of my invention; but the more complete the vacuum in the chamber the smaller the bale may be made.

My invention may be modified in many ways without departing from its spirit.

Having thus described my invention, what I claim, and desire to secure by Letters Patent, is—

1. In a baling-press, the combination with means for creating a partial vacuum in a mass of cotton or similar material, of means for compressing the cotton or material so treated.

2. In a baling-press, the combination with means for creating a partial vacuum in a mass of cotton or similar material, of means for subjecting the mass so treated to pressure first in one direction and then in a direction at right angles thereto.

3. In a baling-press, the combination with means for compressing a mass of cotton or similar material, of means for simultaneously creating in said mass a partial vacuum.

4. In a baling-press, the combination with a chamber adapted to receive therein, in a light or fluffy condition, a mass of cotton or similar material, of means for creating a partial vacuum in said chamber, and means for compressing the cotton or similar material in said chamber.

5. In a baling-press, the combination with a chamber adapted to receive, in a fluffy or light state, a mass of cotton or similar material, of means for creating a partial vacuum in said chamber, means for compressing said cotton or other material in said chamber in one direction, and means for compressing said cotton or other material in a direction at an angle to the direction of first compression.

6. In a baling-press, the combination with a baling-chamber, of means for creating therein a partial vacuum, of means for compressing laterally cotton or similar material held in said chamber, and means for further compressing in another direction, said partially-compressed cotton or other material.

7. In a baling-press, the combination with a chamber having a discharge-opening and a removable closure therefor, of a plunger reciprocable toward and from said closure in said chamber, a laterally-movable plunger in said chamber movable toward and from the first-named plunger, and means for creating a partial vacuum in said chamber.

8. In a baling-press, the combination with a baling-chamber provided with a discharge-opening and a removable closure therefor, a plunger in said chamber reciprocable toward and from said closure, a second plunger in said chamber reciprocable therein in a direction at an angle to the movement of the first plunger, means for so reciprocating the second plunger, and means for creating a partial vacuum in said chamber.

9. In a baling-press, the combination with a baling-chamber provided with a discharge-opening having a removable closure, of a plunger in said chamber reciprocable toward and from said closure, two laterally-movable plungers in said chamber disposed respectively upon opposite sides of the first-named plunger and between which the first-named plunger is movable toward and from said closure, and means for creating a partial vacuum in said chamber.

10. In a baling-press, the combination with a baling-chamber provided with a discharge-opening having a removable closure, of a vertically-movable plunger in said chamber movable toward and from said closure, two laterally-movable plungers hinged in said chamber and movable toward and from the other plunger and each other, and means for creating a partial vacuum in said chamber.

11. In a baling-press, the combination with a baling-chamber provided with an opening having a removable closure, said chamber having closed outer walls and perforated inner side walls, two of said perforated side walls being movable between the other two perforated walls toward and from each other, a plunger in said chamber reciprocatively mounted between said perforated walls and movable toward and from said closure, and means for creating a partial vacuum in said chamber.

12. In a baling-press, the combination with a baling-chamber provided with an opening having a removable closure, said chamber having closed outer walls and perforated inner side walls separated from the outer walls by an air-space, two of said perforated walls being hinged to the outer walls and movable toward and from each other between the other two perforated walls, a plunger located in said chamber between said perforated walls and movable toward and from said closure, and means for creating a partial vacuum in said chamber.

13. In a baling-press, the combination with a baling-chamber provided with an opening having a removable closure in one end, of two perforated plungers disposed in said chamber at opposite sides respectively of said opening and movable laterally in said chamber to and fro, means for so moving said perforated plungers, a plunger vertically movable between said perforated plungers and between the walls of the chamber toward and from said closure, and means for creating a partial vacuum in said chamber.

14. In a baling-press, the combination with a baling-chamber provided with an opening having a removable closure, and having double walls, the inner walls being perforated and separated from the outer walls by an air-space, of means for withdrawing the air from said air-space, and means for compressing the cotton held between said perforated inner walls.

In testimony whereof I have signed my name to this specification in presence of two subscribing witnesses.

ANDREW D. BEATY.

Witnesses:
WARREN D. HOUSE,
HENRY F. ROSE.